(12) United States Patent
Kho et al.

(10) Patent No.: US 10,860,130 B2
(45) Date of Patent: Dec. 8, 2020

(54) TOUCH SENSITIVE ELEMENT AND DISPLAY DEVICE INCLUDING THE SAME

(71) Applicant: LG Display Co., Ltd., Seoul (KR)

(72) Inventors: YuSeon Kho, Seoul (KR); Chiwan Kim, Goyang-si (KR); Taeheon Kim, Seoul (KR); Sung-Eui Shin, Seoul (KR); YongWoo Lee, Goyang-si (KR); Kyungyeol Ryu, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/130,770

(22) Filed: Sep. 13, 2018

(65) Prior Publication Data
US 2019/0079630 A1 Mar. 14, 2019

(30) Foreign Application Priority Data
Sep. 13, 2017 (KR) .......................... 10 2017 0117150

(51) Int. Cl.
*G06F 3/041* (2006.01)
*G06F 3/01* (2006.01)
*G06F 1/16* (2006.01)
*G06F 3/0354* (2013.01)

(52) U.S. Cl.
CPC .......... *G06F 3/0414* (2013.01); *G06F 1/1643* (2013.01); *G06F 1/1652* (2013.01); *G06F 3/016* (2013.01); *G06F 3/03547* (2013.01); *G06F 3/041* (2013.01)

(58) Field of Classification Search
CPC .... G06F 3/0414; G06F 3/016; G06F 3/03547; G06F 3/041; G06F 1/1652; G06F 1/1643
See application file for complete search history.

(56) References Cited

U.S. PATENT DOCUMENTS

| 2010/0001972 | A1* | 1/2010 | Jiang | ...................... | B82Y 10/00 |
| | | | | | 345/173 |
| 2017/0357325 | A1* | 12/2017 | Yang | ........................ | G06F 3/016 |
| 2018/0335850 | A1* | 11/2018 | Yamazaki | .............. | G06F 1/1658 |

FOREIGN PATENT DOCUMENTS

| KR | 10-2015-0030403 A | 3/2015 |
| KR | 10-1664980 B1 | 10/2016 |

* cited by examiner

*Primary Examiner* — Christopher E Leiby
(74) *Attorney, Agent, or Firm* — Seed IP Law Group LLP (57) ABSTRACT

A display device to an embodiment of the present disclosure comprises a display panel including an active area having a bending area, a first touch sensitive element which overlaps the active area of the display panel and includes a first electroactive layer, a bending member which is disposed below the display panel and overlaps at least the bending area, and a second touch sensitive element including a second electroactive layer which covers the bending member. Therefore, in the bending area where the stress due to the bending is concentrated, the lifespan and the driving stability of the first touch sensitive element and the second touch sensitive element may be improved.

16 Claims, 4 Drawing Sheets

TOUCH SENSITIVE ELEMENT AND DISPLAY DEVICE INCLUDING THE SAME

CROSS-REFERENCE TO RELATED APPLICATIONS

This application claims the priority of Korean Patent Application No. 10-2017-0117150 filed on Sep. 13, 2017, in the Korean Intellectual Property Office, the disclosure of which is incorporated herein by reference.

BACKGROUND

Technical Field

The present disclosure relates to a touch sensitive element and a display device including the same, and more particularly, to a touch sensitive element which increases a resistance against a deformation in a bending area when the touch sensitive element is bent and improves a lifespan and a display device including the same.

Description of the Related Art

A touch panel is a device which senses a touch input of a user, such as a screen touch onto a display device or a gesture and is widely utilized in portable display devices such as smart phones and table PCs as well as in large-size display devices, such as display devices of public facilities and smart TVs. An operating manner of the touch panel includes a resistive type, a capacitive type, an optical type, an electromagnetic (EM) type, and the like.

However, recently, a haptic device which is a touch sensitive element which not only senses a touch input of a user, but also transmits a tactile feedback which can be felt through a finger or a stylus pen of the user as a feedback for a touch input of the user is being studied.

As such a haptic device, a haptic device using an electroactive polymer (EAP) is being studied. The haptic device using the electroactive polymer is thin and flexible so that it can be easily applied to various display devices. However, in the haptic device using an electroactive polymer which is applied to a flexible display device, a stress is concentrated in a bending area which is repeatedly bent so that there is a problem in that a lifespan and a driving stability of the haptic device using an electroactive polymer are degraded.

BRIEF SUMMARY

The present disclosure provides a touch sensitive element in which a lifespan and a driving stability of a touch sensitive element in a stress-concentrated portion caused by the bending are improved and a display device including the same.

The present disclosure provides a touch sensitive element having an excellent vibration characteristic even in repeated bending and a display device including the same.

The present disclosure provides a touch sensitive element which directly functions as a bending member such as a hinge when it is applied to a flexible display device to simplify a manufacturing process and a configuration and a display device including the same.

Objects of the present disclosure are not limited to the above-mentioned objects, and other objects, which are not mentioned above, can be clearly understood by those skilled in the art from the following descriptions.

According to an aspect of the present disclosure, a display device includes: a display panel including an active area having a bending area; a first touch sensitive element which overlaps the active area of the display panel and includes a first electroactive layer; a bending member which is disposed below the display panel and overlaps at least the bending area; and a second touch sensitive element including a second electroactive layer which covers the bending member. Therefore, in the bending area where the stress due to the bending is concentrated, the lifespan and the driving stability of the first touch sensitive element and the second touch sensitive element may be improved.

According to another aspect of the present disclosure a display device includes: a display panel including an active area having a bending area; a first touch sensitive element overlapping the active area; and a second touch sensitive element which is disposed to correspond to the bending area below the display panel and includes a hollow tube shaped bending member formed of an electroactive polymer. Therefore, the bending member is formed by the touch sensitive element to simplify a manufacturing process and a configuration.

Other detailed matters of the example embodiments are included in the detailed description and the drawings.

According to the present disclosure, an electroactive layer in a stress-concentrated portion caused by the bending is formed to be thick to disperse a load, thereby ensuring a stable vibration characteristic of the touch sensitive element.

According to the present disclosure, a process for forming an electrode of a touch sensitive element is simplified and a lowering of a reliability of a touch sensitive element due to repeated bending is also minimized.

According to the present disclosure, the touch sensitive element may also function as a bending member which may easily bend the display device so that a process of disposing a bending member may be simplified and an additional vibration function may be provided to the bending area.

The effects according to the present disclosure are not limited to the contents exemplified above, and more various effects are included in the present specification.

BRIEF DESCRIPTION OF THE SEVERAL VIEWS OF THE DRAWINGS

The above and other aspects, features and other advantages of the present disclosure will be more clearly understood from the following detailed description taken in conjunction with the accompanying drawings, in which.

DETAILED DESCRIPTION

Advantages and characteristics of the present disclosure and a method of achieving the advantages and characteristics will be clear by referring to example embodiments described below in detail together with the accompanying drawings. However, the present disclosure is not limited to the example embodiment disclosed herein but will be implemented in various forms. The example embodiments are provided by way of example only so that a person of ordinary skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the example embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for the convenience of description, and the present disclosure is not limited to the size and the thickness of the component illustrated.

The features of various embodiments of the present disclosure can be partially or entirely adhered to or combined with each other and can be interlocked and operated in technically various ways as understood by those skilled in the art, and the embodiments can be carried out independently of or in association with each other.

Hereinafter, various example embodiments of the present disclosure will be described in detail with reference to accompanying drawings.

Figure 1:
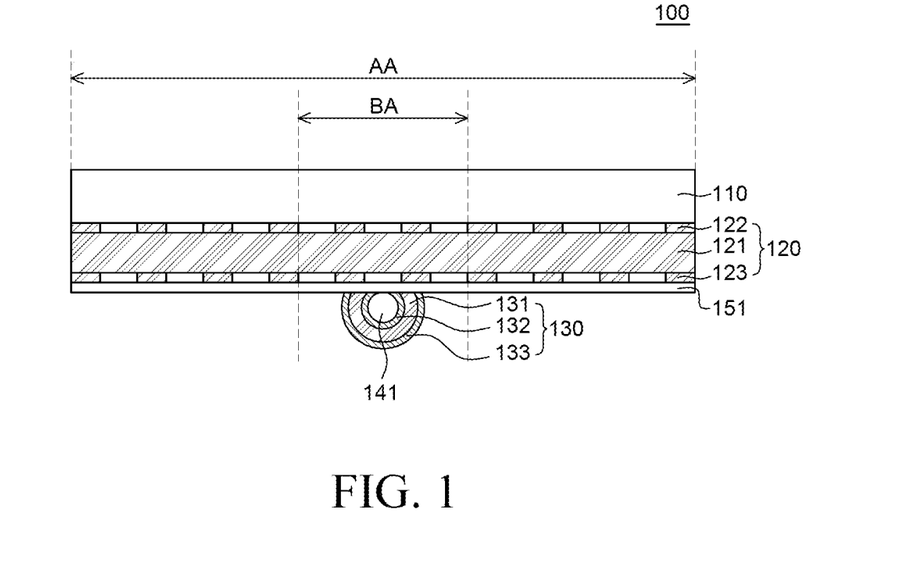
FIG. 1 is a cross-sectional view of a display device according to an example embodiment of the present disclosure.

FIG. 1 is a cross-sectional view of a display device according to an example embodiment of the present disclosure. Referring to FIG. 1, a display device 100 according to an example embodiment of the present disclosure includes a display panel 110, a bending member, a first touch sensitive element 120, and a second touch sensitive element 130.

The display panel 110 is a configuration for displaying images. In the display panel 110, a display element for displaying images and various circuits for driving the display element are disposed on a substrate. For example, when the display device 100 according to the example embodiment of the present disclosure is an organic light emitting display device, the display panel 110 may include a substrate, a thin film transistor and a wiring line on the substrate, an organic light emitting diode, an encapsulating layer, a polarizer, and the like. However, the display panel is not limited thereto and various types of display panels may be used as the display panel 110.

The display panel 110 includes an active area AA and a non-active area NA (not specifically shown for simplicity purposes). The active area AA is an area where images are displayed and a display element and circuits and components for driving the display element are disposed therein. In FIG. 1, for the convenience of description, the display panel 110 is schematically illustrated and only the active area AA is illustrated.

The active area AA includes a bending area BA. The bending area BA is an area where the display device 100 is bent. Therefore, the display device 100 according to the example embodiment of the present disclosure may be implemented by a bendable display device or a foldable display device. In the meantime, the bending area BA is repeatedly bent and a stress is concentrated on various components and wiring lines disposed in the bending area BA so that components disposed in the bending area BA may be damaged.

Even though not illustrated in FIG. 1 for the convenience of description, the non-active area NA is an area where images are not displayed but circuits and components for driving the display element of the active area AA are disposed. The non-active area NA may extend from the active area AA or enclose the active area AA.

A first touch sensitive element 120 is disposed below the display panel 110. The first touch sensitive element 120 is an element which transmits a tactile feedback for a touch input of a user. For example, when a touch input of a user on a specific point is sensed, the first touch sensitive element 120 generates a vibration in the specific point. Even though in FIG. 1, it is illustrated that the first touch sensitive element 120 is disposed below the display panel 110, the first touch sensitive element 120 may be disposed above the display panel 110 depending on example embodiments.

The first touch sensitive element 120 includes a first electroactive layer 121, a plurality of first electrodes 122, and a plurality of second electrodes 123.

The first electroactive layer 121 is configured through an electroactive polymer. The first electroactive layer 121 may be a film formed of an electroactive polymer which is a polymer material which is deformed by an electrical stimulation. When an electric field is applied to the first electroactive layer 121, an alignment direction of dipoles in the electroactive polymer which configures the first electroactive layer 121 is changed and thus the first electroactive layer 121 vibrates by an electrostatic attractive force or repulsive force.

The first electroactive layer 121 may be formed of a PVDF based polymer. For example, the first electroactive layer 121 may be formed of a PVDF copolymer such as PVDF-TrFE or a PVDF terpolymer such as PVDF-TrFE-CFE or PVDF-TrFE-CTFE. The PVDF copolymer and the PVDF terpolymer are ferroelectric polymers or relaxed ferroelectric polymers so that the PVDF copolymer and the PVDF terpolymer may advantageously generate large vibration even at a low driving voltage. Further, in the PVDF copolymer and the PVDF terpolymer, trifluoroethylene (TrFE) is randomly coupled to PVDF to naturally form a βphase by an electronegativity difference between the hydrogen (H) atom and the fluorine (F) atom. Therefore, differently from a PVDF homopolymer, there are advantages in that a polling process for forming a β phase is not necessary, a manufacturing process of the first touch sensitive element 120 is simplified, and a manufacturing cost is saved.

The plurality of first electrodes 122 and the plurality of second electrodes 123 are disposed on an upper surface and a lower surface of the first electroactive layer 121, respectively. The first electrodes 122 and the second electrodes 123 are electrodes for applying the voltage to the first electroactive layer 121 and are formed of a conductive material.

In the meantime, when the first touch sensitive elements 120 are disposed above the display panel, in order to ensure transmittance of the first touch sensitive element 120, the first electrodes 122 and the second electrodes 123 may be formed of a transparent conductive material. For example, the first electrodes 122 and the second electrodes 123 may be formed of a transparent conductive material such as indium tin oxide (ITO), aluminum doped zinc oxide (AZO), fluorine tin oxide (FTO), or silver-nanowire (AgNW).

Further, the first electrodes 122 and the second electrodes 123 may be configured by a metal mesh. That is, the first electrodes 122 and the second electrodes 123 are configured by a metal mesh in which a metal material is disposed in the form of mesh so that the first electrodes 122 and the second electrodes 123 may substantially serve as transparent electrodes. However, constituent materials of the first electrodes 122 and the second electrodes 123 are not limited to the above-described example, and various transparent conductive materials may be used for the constituent materials of the first electrodes 122 and the second electrodes 123. The first electrodes 122 and the second electrodes 123 may be formed of the same material or different materials.

The plurality of first electrodes 122 and the plurality of second electrodes 123 may be formed by various methods. For example, the plurality of first electrodes and the plurality of second electrodes 123 may be formed on the first electroactive layer 121 by a method such as sputtering, printing, or slit coating.

The plurality of first electrodes 122 and the plurality of second electrodes 123 may be formed to various shapes as needed. For example, the plurality of first electrodes 122 is disposed on the upper surface of the first electroactive layer 121 and the plurality of second electrodes 123 is disposed on the lower surface thereof. In this case, the plurality of first electrodes 122 which is disposed on the upper surface of the first electroactive layer 121 extends in an X-axis direction and the plurality of second electrodes 123 which is disposed on the lower surface of the first electroactive layer 121 extends in a Y-axis direction to intersect each other. Therefore, the first touch sensitive element 120 may be driven by a vertical electric field between the plurality of first electrodes 122 and the plurality of second electrodes 123. Further, both the plurality of first electrodes 122 and the plurality of second electrodes 123 are disposed only one surface of the first electroactive layer 121 so that the first touch sensitive element 120 may be driven by a horizontal electric field between the plurality of first electrodes 122 and the plurality of second electrodes 123. Further, as illustrated in FIG. 1, the plurality of first electrodes 122 on the upper surface of the first electroactive layer 121 and the plurality of second electrodes 123 on the lower surface are disposed to be opposite to each other, so that the first touch sensitive element 120 may be independently driven in the unit of cells. In this case, the first touch sensitive element 120 may be driven by means of a horizontal electric field between the plurality of first electrodes 122, a horizontal electric field between the plurality of second electrodes 123 and/or the vertical electric field between the plurality of first electrodes 122 and the plurality of second electrodes 123. Hereinafter, as illustrated in FIG. 1, the first touch sensitive element 120 which is configured by the plurality of first electrodes 122 disposed on the upper surface of the first electroactive layer 121 and the plurality of second electrodes 123 disposed on the lower surface of the first electroactive layer 121 will be described.

Referring to FIG. 1, the first touch sensitive element 120 includes the plurality of first electrodes 122 on the upper surface of the first electroactive layer 121 and the plurality of second electrodes 123 on the lower surface of the first electroactive layer 121. In order to form an electric field on the first electroactive layer 121, voltages having different amplitudes or voltages having opposite electric properties may be applied to the plurality of first electrodes 122 and the plurality of second electrodes 123. In this case, various combinations of voltages are applied to the plurality of first electrodes 122 and the plurality of second electrodes 123 to form various electric fields. Therefore, the first touch sensitive element 120 is driven in various manners so that various tactile senses may be directly transmitted to the user.

An insulating layer 151 is disposed below the first touch sensitive element 120. The insulating layer 151 is a configuration which insulates the first touch sensitive element 210→120 from a second touch sensitive element 130 disposed below the first touch sensitive element 120.

A bending member including a columnar unit 141 is disposed below the insulating layer 151. The bending member is disposed to overlap the bending area BA of the display panel 110. The bending area BA of the display panel 110 is bent with respect to the bending member and the bending member may support the bent display panel 110. For example, the bending member may have various structures which easily bend the display panel 110 and support the display panel 110 at the time of bending, such as a hinge or a support. Hereinafter, for the convenience of description, the bending member is described as a hinge, but is not limited thereto.

The bending member includes a columnar unit 141. The columnar unit 141 may be disposed to be close to a center portion of the bending area BA. Therefore, the display panel 110 may be bent with respect to the columnar unit 141. The columnar unit 141 serves as a bending axis when the display panel 110 is bent and also serves as a support for supporting the display panel 110. Therefore, the display panel 110 may be bent or folded with respect to the columnar unit 141.

The columnar unit 141 may be formed of an insulating material. For example, the columnar unit 141 may be formed of an insulating material such as plastic. However, a material of the columnar unit 141 is not limited as long as the material is easily attached to the second touch sensitive element 130 and supports the display panel 110 at the time of bending.

The second touch sensitive element 130 is disposed to cover the columnar unit 141. The second touch sensitive element 130 includes a second electroactive layer 131, a third electrode 132, and a fourth electrode 133.

The second electroactive layer 131 is configured by an electroactive polymer. When an electric field is applied to the second electroactive layer 131, an alignment direction of dipoles in the electroactive polymer which configures the second electroactive layer 131 is changed and thus the second electroactive layer 131 vibrates by an electrostatic attractive force or repulsive force. Since the second electroactive layer 131 may be formed of the same material as the first electroactive layer 121 of the first touch sensitive element 120 described above, a redundant description will be omitted.

The third electrode 132 and the fourth electrode 133 are disposed on both surfaces of the second electroactive layer 131. The third electrode 132 and the fourth electrode 133 are electrodes for applying the voltage to the second electroactive layer 131 and are formed of a conductive material. As compared with the first electrodes 122 and the second electrodes 123 of the first touch sensitive element 120 described above, except that only one third electrode 132 and one fourth electrode 133 are provided, the third electrode 132 and the fourth electrode 133 are substantially the same as the first electrodes 122 and the second electrodes 123. Therefore, a redundant description will be omitted.

The second touch sensitive element 130 is disposed to cover the columnar unit 141 so that the second touch sensitive element 130 may be configured to have a semicircular shape. For example, the third electrode 132 which is disposed to enclose the columnar unit 141 is disposed to enclose a part of an outer peripheral surface of the columnar unit 141. Further, the second electroactive layer 131 is disposed so as to enclose an outer peripheral surface of the third electrode 132. Finally, the fourth electrode 133 is disposed so as to enclose an outer peripheral surface of the second electroactive layer 131.

When the second touch sensitive element 130 is formed as illustrated in FIG. 1, after disposing the columnar unit 141 on the insulating layer 151, the third electrode 132, the second electroactive layer 131, and the fourth electrode 133 are sequentially formed, but it is not limited thereto.

After separately forming the second touch sensitive element 130 on the columnar unit 141, the columnar unit 141 enclosed by the second touch sensitive element 130 may be attached onto the insulating layer. That is, in a state when the columnar unit 141 is separately located, the third electrode 132, the second electroactive layer 131, and the fourth electrode 133 may be sequentially formed. In this case, the second touch sensitive element 130 is disposed to completely enclose the columnar unit 141 so that the entire second touch sensitive element 130 may be configured to have a columnar shape enclosing the columnar unit 141. Therefore, only the fourth electrode 133 of the second touch sensitive element 130 between the second touch sensitive element 130 and the columnar unit 141 may be in contact with the insulating layer.

In the meantime, as the second touch sensitive element 130 is additionally disposed along the columnar unit 141, there may be a vibration acceleration difference between the bending area BA and an area excluding the bending area BA. That is, since an additional vibration may be applied to the bending area BA but is not applied to the other area, a vibration acceleration of the bending area BA may be higher than that of the other area. However, in the display device 100 according to the example embodiment of the present disclosure, a circuit which drives the first touch sensitive element 120 and the second touch sensitive element 130 adjusts a signal which is applied to the first touch sensitive element 120 and the second touch sensitive element 130 and applies a compensation signal so that the vibration acceleration in the bending area BA is not excessively increased.

Even though not illustrated in FIG. 1, the display device 100 may further include a touch panel which measures a touch input position of the user and/or strength of a touch pressure. The touch panel may be located between the display panel 110 and the first touch sensitive element 120 or on the display panel 110 and a specific configuration of the touch panel is not limited.

Among the touch sensitive elements, a touch sensitive element using an electroactive polymer is thin and flexible so as to be applied to various display devices. Specifically, a touch sensitive element using an electroactive polymer may be applied to a flexible display device which is bendable or foldable, among the display devices. However, the flexible display device includes a flexible bending area which is bendable or foldable and a stress is concentrated in the bending area due to repeated bending. The stress results in a damage of the touch sensitive element disposed in the bending area, the lowering of a lifespan or a driving stability of the touch sensitive element in the bending area and degradation of the vibration characteristic.

Therefore, in the display device 100 according to the example embodiment of the present disclosure, an additional second touch sensitive element 130 is disposed in the bending area BA other than the first touch sensitive element 120 disposed in the active area AA. Specifically, the second touch sensitive element 130 may be disposed to cover the columnar unit 140 which is a bending member which helps to bend the display device 100. Therefore, even though the first touch sensitive element 120 is damaged or the vibration characteristic is degraded due to the concentrated stress in the bending area BA, the second touch sensitive element 130 is further disposed to disperse the stress concentrated on the first touch sensitive element 120. Further, even though the vibration characteristic of the first touch sensitive element 120 is degraded, the second touch sensitive element 130 may reinforce the vibration characteristic. In addition, the second touch sensitive element 130 disposed to correspond to the bending area BA vibrates to supply an additional vibration effect in the bending area BA. Accordingly, the display device 100 according to the example embodiment of the present disclosure further includes the second touch sensitive element 130 disposed in the bending area BA to disperse the stress concentrated in the first touch sensitive element 120. Therefore, the damage of the first touch sensitive element 120 is minimized to ensure a stable vibration characteristic and an additional vibration effect in the bending area BA is further provided.

Hereinafter, the effect of the display device 100 according to the example embodiment of the present disclosure will be described in more detail with reference to Table 1.

TABLE 1

| Number of bending times | Comparative Example | Example |
|---|---|---|
| 5,000 times | 0.6 G | 0.8 G |
| 10,000 times | 0.5 G | 0.8 G |
| 15,000 times | 0.5 G | 0.7 G |
| 20,000 times | 0.3 G | 0.7 G |
| 25,000 times | 0.2 G | 0.7 G |
| 30,000 times | 0.2 G | 0.7 G |

In Table 1, the example represents a vibration acceleration in the bending area BA in accordance with the number of bending times in the display device 100 according to the example embodiment described with reference to FIG. 1 and the comparative example represents a vibration acceleration in the bending area according to the number of bending times when the second touch sensitive element 130 is removed from the display device 100 according to the example embodiment of the present disclosure.

Referring to Table 1, since the additional second touch sensitive element 130 is disposed in the bending area BA in the example, an initial vibration acceleration is higher than that of the comparative example. However, in Example, even though the number of bending times is 30000, a reduced vibration acceleration is just 0.1 G. In contrast, in the comparative example, as the number of bending times is increased, the vibration acceleration is rapidly reduced so that when the number of bending times is 30000, the vibration acceleration is reduced by 0.4 G.

Therefore, as compared with the comparative example, it is confirmed that in the display device 100 according to the example embodiment of the present disclosure, a more stable vibration characteristic in the bending area BA may be provided.

Figure 2:
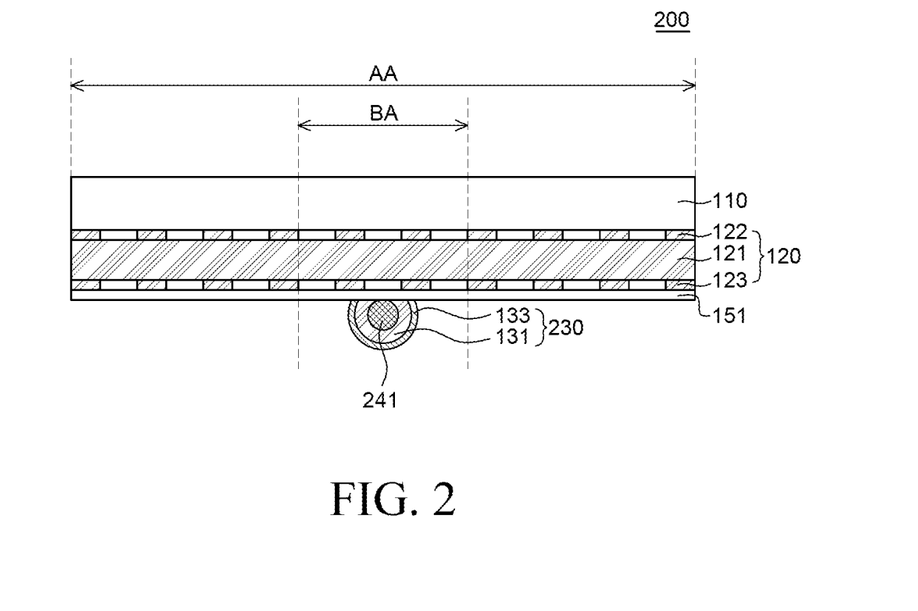
FIG. 2 is a cross-sectional view of a display device according to another example embodiment of the present disclosure.

FIG. 2 is a cross-sectional view of a display device according to another example embodiment of the present disclosure. As compared with the display device 100 of FIG. 1, in a display device 200 of FIG. 2, since a material of a columnar unit 241 which is a bending member and an arrangement of the electrodes of the second touch sensitive element 230 are different, but the remaining configuration is substantially the same, a redundant description will be omitted.

Referring to FIG. 2, the columnar unit 241 which is a bending member is formed of a conductive material. Therefore, the columnar unit 241 which is formed of a conductive material not only helps to bend the display device 200, but also serves as an electrode of the second touch sensitive element 230 which is disposed to cover the columnar unit 241.

The second touch sensitive element 230 is disposed to cover the columnar unit 241 and includes a second electroactive layer 131 and a fourth electrode 133 which is disposed to cover the second electroactive layer 131. Therefore, since the columnar unit 241 which is in contact with one surface of the second electroactive layer 131 is a conductive material, the columnar unit 241 may be utilized as an electrode of the second touch sensitive element 230. The second touch sensitive element 230 may be driven by the columnar unit 241 disposed on one surface of the second electroactive layer 131 and the fourth electrode 133 disposed on the other surface.

In the display device 200 according to another example embodiment of the present disclosure, since the columnar unit 241 which is a bending member is formed of a conductive material, the columnar unit 241 may be utilized as an electrode of the second touch sensitive element 230 disposed to enclose the columnar unit 241. Therefore, since the display device 200 according to another example embodiment of the present disclosure utilizes the bending member as an electrode of the second touch sensitive element 230, a process of forming an electrode of the second touch sensitive element 230 may be simplified and the structure of the display device 200 may be more simplified.

Figure 3:
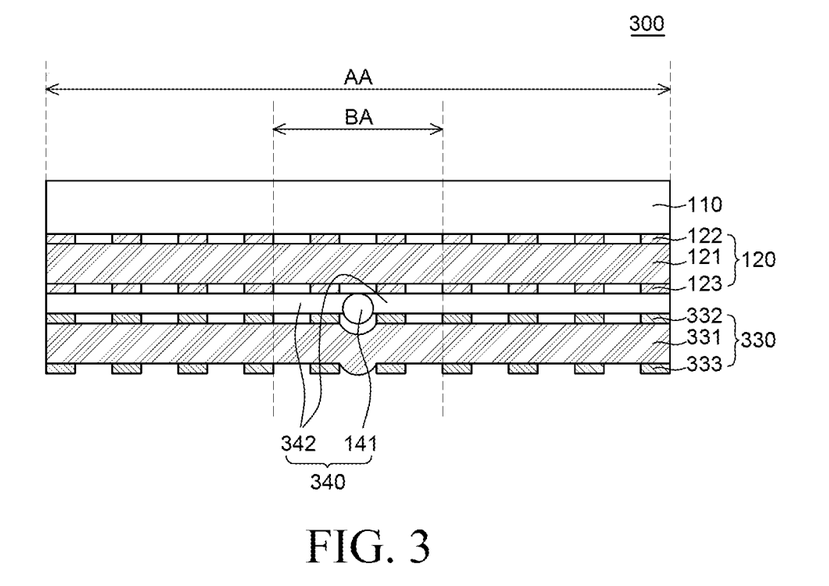
FIG. 3 is a cross-sectional view of a display device according to still another example embodiment of the present disclosure.

FIG. 3 is a cross-sectional view of a display device according to still another example embodiment of the present disclosure. As compared with the display device 100 of FIG. 1, in a display device 300 of FIG. 3, since only configurations of a bending member 340 and a second touch sensitive element 330 are different but the remaining configuration is substantially the same, a redundant description will be omitted.

Referring to FIG. 3, the bending member 340 includes a columnar unit 141 and a support 342. The columnar unit 141 is disposed in a center portion of the bending area BA and the support 342 is disposed on both sides of the columnar unit 141 to support the entire active area AA. The support 342 may rotate around the columnar unit 141. Further, the display panel 110 supported by the support 342 rotates together with the rotation of the support 342 to be bent or folded.

The bending member 340 may be formed of an insulating material. That is, both the columnar unit 141 and the support 342 may be formed of an insulating material such as plastic. Since the bending member 340 is formed of an insulating member, the above-described insulating layer 151 may be omitted.

The second touch sensitive element 330 is disposed to cover the bending member 340. Specifically, the second touch sensitive element 330 is disposed to entirely cover the columnar unit 141 and the support 342 of the bending member 340 below the bending member 340. Similarly to the bending member 340, the second touch sensitive element 330 is also disposed over the entire display panel 110.

The second touch sensitive element 330 includes a second electroactive layer 331, a plurality of third electrodes 332, and a plurality of fourth electrodes 333. First, the plurality of third electrodes 332 is disposed on a lower surface of the bending member 340, the second electroactive layer 331 is disposed on lower surfaces of the plurality of third electrodes 332, and the plurality of fourth electrodes 333 is disposed on a lower surface of the second electroactive layer 331. The plurality of fourth electrodes 333 may be disposed to correspond to the plurality of third electrodes 332, respectively. Here, the plurality of third electrodes 332 and the plurality of fourth electrodes 333 may be substantially the same as the first electrodes 122 and the second electrodes 123 of the first touch sensitive element 120, respectively.

In this case, the first touch sensitive element 120 and the second touch sensitive element 330 may be individually or simultaneously driven.

For example, when the first touch sensitive element 120 and the second touch sensitive element 330 are individually driven, different wiring lines may be connected thereto to apply different voltages to the first electrodes 122 and the second electrodes 123 of the first touch sensitive element 120 and the third electrodes 332 and the fourth electrodes 333 of the second touch sensitive element 330. Therefore, when the voltage is applied only to the first electrodes 122 and the second electrodes 123 but is not applied to the third electrodes 332 and the fourth electrodes 333 and vice versa, the first touch sensitive element 120 and the second touch sensitive element 330 may be individually driven.

When the first touch sensitive element 120 and the second touch sensitive element 330 are simultaneously driven, the same voltage is simultaneously applied to the first electrode 122 and the third electrode 332 and the second electrode 123 and the fourth electrode 333 connected to different wiring lines to simultaneously drive the first touch sensitive element 120 and the second touch sensitive element 330. Alternatively, the same wiring line is connected to the first electrode 122 and the third electrode 332 disposed in corresponding positions to be simultaneously applied with the same voltage and the same wiring line is connected to the second electrode 123 and the fourth electrode 333 disposed in corresponding positions to be simultaneously applied with the same voltage. In this case, since the first electrode 122 and the third electrode 332 and the second electrode 123 and the fourth electrode 333 share the same wiring line, the structure of the wiring line may be simplified and a width of the bezel area may be reduced. Further, the same wiring line is connected to the first electrode 122 and the fourth electrode 333 disposed in the corresponding location and the same wiring line is connected to the second electrode 123 and the third electrode 332 disposed in the corresponding position to drive the first touch sensitive element 120 and the second touch sensitive element 330. Similarly, also in this case, the structure of the wiring line may be simplified and the width of the bezel area may be reduced.

However, the present disclosure is not limited thereto and the third electrode 332 of the second touch sensitive element 330 is omitted and the second touch sensitive element 330 may include only the second electroactive layer 331 and the fourth electrode 333. In this case, the second touch sensitive element 330 may be implemented such that the second electroactive layer 331 vibrates by a horizontal electric field formed using the fourth electrode 333.

In the display device 300 according to another example embodiment of the present disclosure, the columnar unit 141 and the support 342 of the bending member 340 are disposed to support at least the entire active area AA of the display panel 110. The second touch sensitive element 330 is also disposed to cover the entire bending member 340 along a shape of the bending member 340. Therefore, similarly to the bending member 340, the second touch sensitive element 330 also overlaps the active area AA of the display panel 110 and also overlaps the entire area of the first touch sensitive element 120 disposed in the entire display panel 110. Therefore, since not only the first touch sensitive element 120, but also the second touch sensitive element 330 is disposed in the entire area of the display panel 110, an effect of providing a strong vibration acceleration in the entire area of the display panel 110 may be provided as well as an effect of suppressing the degradation of the vibration characteristic according to the repeated bending and folding in the bending area BA.

Figure 4:
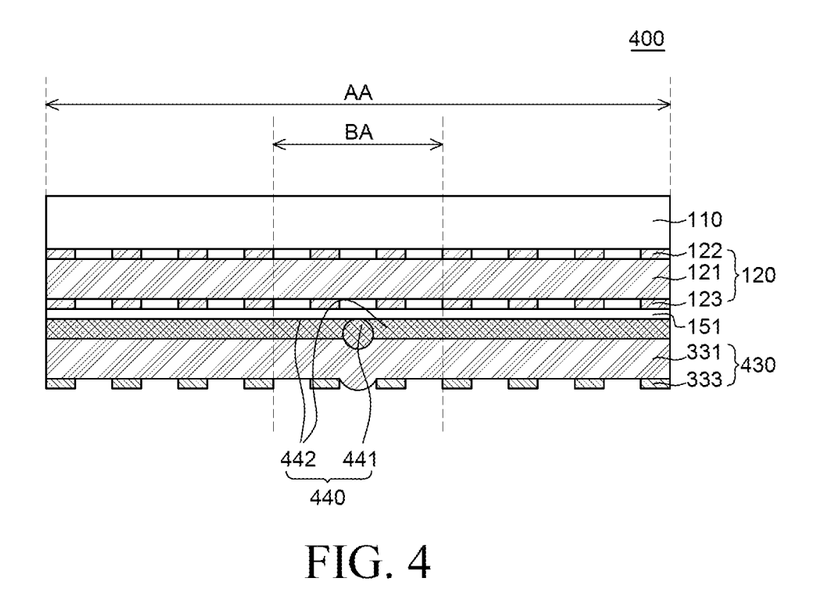
FIG. 4 is a cross-sectional view of a display device according to still another example embodiment of the present disclosure.

FIG. 4 is a cross-sectional view of a display device according to still another example embodiment of the present disclosure. As compared with the display device 400 of FIG. 3, in a display device 400 of FIG. 4, since only a material of a bending member 440 and an arrangement of the electrodes of the second touch sensitive element 430 are different, but the remaining configuration is substantially the same, a redundant description will be omitted.

Referring to FIG. 4, the bending member 440 is formed of a conductive material. That is, both the columnar unit 441 and the support 442 of the bending member 440 may be formed of a conductive member. As the bending member 440 is formed of a conductive material, an insulating layer 151 is disposed between the bending member 440 and the first touch sensitive element 120. The insulating layer 151 is disposed between the second electrode 123 of the first touch sensitive element 120 and the bending member 440 to suppress the reduction of the reliability of the first touch sensitive element 120 due to the bending member 440 formed of a conductive material when the first touch sensitive element 120 is driven.

The bending member 440 formed of a conductive material is in contact with an upper surface of the second electroactive layer 331 of the second touch sensitive element 430. In the second touch sensitive element 430, only a plurality of fourth electrodes 333 is disposed on a lower surface of the second electroactive layer 331. Therefore, the bending member 440 formed of a conductive material may serve as an electrode of the second touch sensitive element 430 together with the plurality of fourth electrodes 333. In this case, the second touch sensitive element 430 may be driven in the unit of cell by applying different voltages to the plurality of fourth electrodes 333 in a state when a specific voltage is applied to the bending member 440.

In the display device 400 according to another example embodiment of the present disclosure, the bending member 440 which is a conductive material may also be used as an electrode of the second touch sensitive element 430. That is, the bending member 440 of the conductive material which is in contact with the second touch sensitive element 430 also serves the bending member 440 and simultaneously serves as an electrode of the second touch sensitive element 430. Therefore, since the display device 400 according to still another example embodiment of the present disclosure utilizes the bending member 440 as an electrode of the second touch sensitive element 430, a process of forming the electrode of the second touch sensitive element 430 may be simplified and the structure of the display device 200 may be more simplified.

Figure 5:
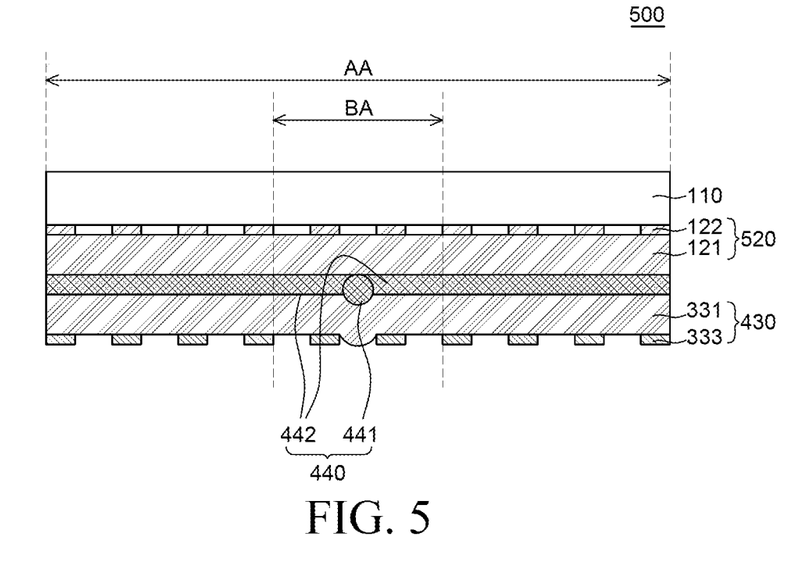
FIG. 5 is a cross-sectional view of a display device according to still another example embodiment of the present disclosure.

FIG. 5 is a cross-sectional view of a display device according to still another example embodiment of the present disclosure. Since a display device 500 of FIG. 5 is different from the display device 400 of FIG. 4 in that an electrode arrangement of the first touch sensitive element 520 is different and the insulating layer 151 is omitted, but other configurations is substantially the same, a redundant description will be omitted.

Referring to FIG. 5, the bending member 440 formed of a conductive material is in contact with a lower surface of the first electroactive layer 121 of the first touch sensitive element 520 and is in contact with an upper surface of the second electroactive layer 331 of the second touch sensitive element 430. Further, in the first touch sensitive element 520, only a plurality of first electrodes 122 on an upper surface of the first electroactive layer 121 is disposed. Further, in the second touch sensitive element 430, only a plurality of fourth electrodes 333 on a lower surface of the second electroactive layer 331 is disposed. Further, the bending member 440 formed of a conductive material may simultaneously serve as electrodes of the first touch sensitive element 520 and the second touch sensitive element 430.

When the bending member 440 is simultaneously used as the electrodes of the first touch sensitive element 520 and the second touch sensitive element 430, the first touch sensitive element 520 and the second touch sensitive element 430 may be individually driven.

For example, when the voltage is applied to the bending member 440 which simultaneously serves as the electrodes of the first touch sensitive element 520 and the second touch sensitive element 430 and different wiring lines are connected to the plurality of first electrodes 122 of the first touch sensitive element 520 and the plurality of fourth electrodes 333 of the second touch sensitive element 430 to be applied with the voltage, the first touch sensitive element 520 and the second touch sensitive element 430 may be selectively driven. In this case, a vertical electric field is formed between the plurality of first electrodes 122 and the bending member 440 and between the bending member 440 and the plurality of fourth electrodes 333 which are vertically disposed. Therefore, even though the first touch sensitive element 520 and the second touch sensitive element 430 share the bending member 440 as one electrode, the first touch sensitive element 520 and the second touch sensitive element 430 may be individually driven.

In the meantime, when the bending member 440 is simultaneously used as the electrodes of the first touch sensitive element 520 and the second touch sensitive element 430, the first touch sensitive element 520 and the second touch sensitive element 430 may be driven as one touch sensitive element.

For example, when a specific voltage is applied to the bending member 440 which serves as the electrodes of the first touch sensitive element 520 and the second touch sensitive element 430 and the same wiring line is connected to the plurality of first electrodes 122 of the first touch sensitive element 520 and the plurality of fourth electrodes 333 of the second touch sensitive element 430 to be applied with the a voltage which is different from a voltage applied to the bending member 440, the first touch sensitive element 520 and the second touch sensitive element 430 may be driven as one touch sensitive element.

In the display device 500 according to another example embodiment of the present disclosure, the bending member 440 which is a conductive material may simultaneously serve as electrodes of the first touch sensitive element 520 and the second touch sensitive element 430. In this case, a voltage which is different from a voltage applied to the bending member 440 is applied to the plurality of first electrodes 122 and the plurality of fourth electrodes 333 so that the first touch sensitive element 520 and the second touch sensitive element 430 may be individually driven. Therefore, without separately forming electrodes on both surfaces of the first touch sensitive element 520 and both surfaces of the second touch sensitive element 430, the first touch sensitive element 520 and the second touch sensitive element 430 may be driven. Therefore, the display device 500 according to another example embodiment of the present disclosure simultaneously uses the bending member 440 as the electrodes of the first touch sensitive element 520 and the second touch sensitive element 430 so that a process for forming the electrodes of the first touch sensitive element 520 and the second touch sensitive element 430 may be simplified. Further, as the electrode arrangement is simplified, the structure of a wiring line for applying a voltage to each electrode and a structure of the display device 500 may also be simplified.

Further, the same wiring line is connected to the plurality of first electrodes 122 of the first touch sensitive element 520 and the plurality of fourth electrodes 333 of the second touch sensitive element 430 to be applied with the same voltage and simultaneously driven. Therefore, in the display device 500 according to still another example embodiment of the present disclosure, the first touch sensitive element 520 and the second touch sensitive element 430 share the bending member 440 as one electrode and the first electrodes 122 and the fourth electrodes 333 also share the same wiring line. Therefore, the wiring structure is simplified and the electrode forming process is also simplified.

Figure 6:
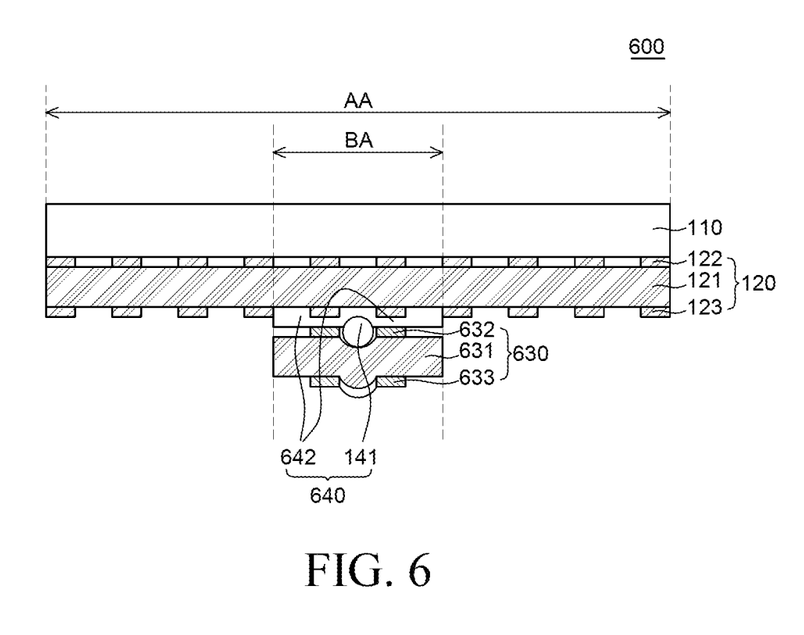
FIG. 6 is a cross-sectional view of a display device according to still another example embodiment of the present disclosure.

FIG. 6 is a cross-sectional view of a display device according to still another example embodiment of the present disclosure. As compared with the display device 300 of FIG. 3, in a display device 600 of FIG. 6, since only a bending member 640 and a second touch sensitive element 630 are different, but the remaining configuration is substantially the same, a redundant description will be omitted.

Referring to FIG. 6, the bending member 640 is disposed to overlap a partial area of the display panel 110. Specifically, a columnar unit 141 and a support 642 of the bending member 640 are disposed to support only a bending area BA in an active area AA of the display panel 110. However, it is not limited thereto and the bending member 640 may be further disposed in a partial area of the active area AA, rather than the bending area BA.

A second touch sensitive element 630 disposed to cover the bending member 640 is also disposed to overlap only a partial area of the display panel 110. That is, as illustrated in FIG. 6, the second touch sensitive element 630 is disposed to be limited to the bending area BA. However, it is not limited thereto and the second touch sensitive element 630 may be further disposed in a partial area of the active area AA, rather than the bending area BA.

In the display device 600 according to still another example embodiment of the present disclosure, the bending member 640 is disposed to overlap only a partial area of the display panel 110, that is, the bending area BA. Further, since the second touch sensitive element 630 is also disposed along the shape of the bending member 640, the second touch sensitive element 630 is also disposed to overlap only the bending area BA. That is, when the support 642 of the bending member 640 is disposed to support only a partial area including the bending area BA of the display panel 110, the second touch sensitive element 630 is also disposed only in a partial area of the display panel 110. Therefore, the display device 600 according to still another example embodiment of the present disclosure may be freely set a design of the second touch sensitive element 630 according to a design such as a shape or an arrangement of the bending member 640, so that a degree of freedom of design may be increased.

Figure 7:
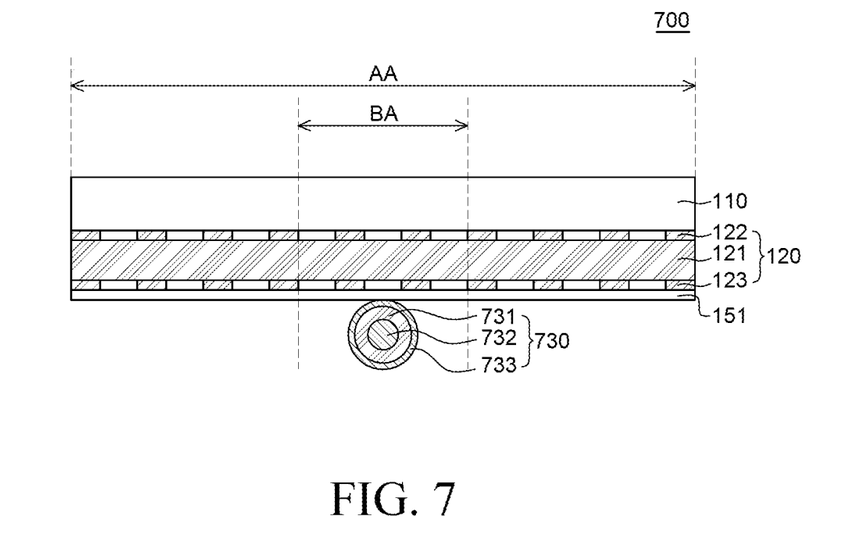
FIG. 7 is a cross-sectional view of a display device according to still another example embodiment of the present disclosure.

FIG. 7 is a cross-sectional view of a display device according to still another example embodiment of the present disclosure. A display device 700 of FIG. 7 is different from the display device 100 of FIG. 1 in that a second touch sensitive element 730 is configured by a bending member, but the remaining configuration is substantially the same, so that a redundant description will be omitted.

Referring to FIG. 7, the second touch sensitive element 730 includes a hollow-tube shape bending member 731, a third electrode 732, and a fourth electrode 733. The second touch sensitive element 730 not only supplies a vibration effect, but also serves as a bending member.

The bending member 731 is configured by an electroactive polymer. Therefore, when a voltage is applied to the bending member 731, the bending member 731 may vibrate. Further, the bending member 731 may support the display panel 110 to be bent or folded with respect to the bending member 731.

The bending member 731 may be formed to have a hollow tube shape. That is, the bending member 731 may be formed to have a columnar shape with an empty inside, but is not limited thereto.

A third electrode 732 is disposed on an inner circumferential surface of the bending member 731 and a fourth electrode 733 is disposed on an outer circumferential surface. Different voltages are applied to the third electrode 732 and the fourth electrode 733 to form an electric field in the bending member 731 formed of an electroactive polymer. Therefore, the vibration effect may occur.

An insulating layer 151 is disposed between the first touch sensitive element 120 and the second touch sensitive element 730. If the insulating layer 151 is not disposed, the second electrode 123 and the fourth electrode 733 are in contact with each other to affect the driving of the first touch sensitive element 120 and the second touch sensitive element 730. Therefore, the insulating layer 151 may be disposed to individually drive the first touch sensitive element 120 and the second touch sensitive element 730.

The fourth electrode 733 of the second touch sensitive element 730 is disposed on the insulating layer 151 to be insulated from the first touch sensitive element 120.

In the meantime, in FIG. 7, it is illustrated that the third electrode 732 on the inner circumferential surface of the second electroactive layer 731 may have a cylindrical shape which is fully filled with a conductive material. However, the third electrode 732 may also be a hollow tube shape with an empty inside, but is not limited thereto.

In the display device 700 according to still another example embodiment of the present disclosure, the second touch sensitive element 730 transmits a tactile feedback for a touch input of the user and also serves as a bending member. At the time of bending the display panel 110, the bending member may support the display panel 110 to be bent or folded around the bending member. A stress is concentrated in the bending area BA, so that the reliability of the first touch sensitive element 120 may be degraded. Therefore, in order to compensate a vibration characteristic of the first touch sensitive element 120, a second touch sensitive element 730 may be further disposed in the bending area BA. Further, the second touch sensitive element 730 is formed to have the same shape as the bending member so that the second touch sensitive element may simultaneously perform the function of the bending member without separately disposing the bending member. Therefore, in the display device 700 according to still another example embodiment of the present disclosure, the second touch sensitive element 730 is formed to have the same shape as the bending member so that the process of disposing the bending member is simplified and an additional vibration effect is generated in the bending area BA.

In the example embodiments illustrated in FIGS. 1 to 7, one bending area BA is provided in the display device 100, 200, 300, 400, 500, 600, and 700, but the display device is not limited thereto and a plurality of bending areas BA may be defined. In this case, the structure of the second touch sensitive element 130, 230, 330, 430, 630, and 730 may be applied to all the bending areas BA.

The example embodiments of the present disclosure can also be described as follows:

According to an aspect of the present disclosure, a display device comprises a display panel including an active area having a bending area, a first touch sensitive element which overlaps the active area of the display panel and includes a first electroactive layer, a bending member which is disposed below the display panel and overlaps at least the bending area, and a second touch sensitive element including a second electroactive layer which covers the bending member.

The bending member may include a columnar unit overlapping the bending area.

The columnar unit may be formed of an insulating material, the second touch sensitive element may further include a third electrode enclosing the columnar unit and a fourth electrode enclosing the second electroactive layer, and the second electroactive layer encloses the third electrode.

The columnar unit may be formed of a conductive material, the second electroactive layer may enclose the columnar unit, and the second touch sensitive element may further include a fourth electrode enclosing the second electroactive layer.

The bending member may further include a support which is disposed on both sides of the columnar unit and overlap at least a part area of the active area.

The support may support the entire active area.

The bending member may be formed of an insulating material, and the second touch sensitive element may further include one or more third electrodes disposed between the bending member and the second electroactive layer.

The second touch sensitive element may further include one or more fourth electrodes which are disposed on an opposite surface of a surface on which the one or more third electrodes are disposed.

The bending member may be formed of a conductive material, the bending member may be disposed on one surface of the second electroactive layer to serve as a third electrode of the second touch sensitive element, and the second touch sensitive element may further include one or more fourth electrodes disposed on the other surface of the second electroactive layer.

The first touch sensitive element may be disposed between the display panel and the second touch sensitive element, the bending member may be in contact with one surface of the first electroactive layer to serve as a second electrode of the first touch sensitive element, and the first touch sensitive element may further include one or more first electrodes disposed on the other surface of the first electroactive layer.

The first touch sensitive element may be disposed between the display panel and the second touch sensitive element, and the first touch sensitive element and the second touch sensitive element may share the bending member as a common electrode.

The first touch sensitive element may further include a plurality of first electrodes disposed on the other surface of one surface of the first electroactive layer which is in contact with the bending member, the second touch sensitive element may further include a plurality of fourth electrodes disposed on the other surface of one surface of the second electroactive layer which is in contact with the bending member, and the same voltage may be applied to the corresponding electrodes of the plurality of first electrodes of the first touch sensitive element and the plurality of fourth electrodes of the second touch sensitive element.

The first touch sensitive element may include a plurality of first electrodes disposed on one surface of the first electroactive layer and a plurality of second electrodes disposed on the other surface, the second touch sensitive element may include a plurality of third electrodes disposed on one surface of the second electroactive layer and a plurality of fourth electrodes disposed on the other surface, the same voltage may be applied to the corresponding electrodes of the plurality of first electrodes of the first touch sensitive element and the plurality of third electrodes of the second touch sensitive element, and the same voltage may be applied to the corresponding electrodes of the plurality of second electrodes of the first touch sensitive element and the plurality of fourth electrodes of the second touch sensitive element.

According to an another aspect of the present disclosure, a display device comprises a display panel including an active area having a bending area, a first touch sensitive element overlapping the active area, and a second touch sensitive element which is disposed to correspond to the bending area below the display panel and includes a hollow tube shaped bending member formed of an electroactive polymer.

The display device may further comprises an insulating layer disposed between the display panel and the second touch sensitive element, and the first touch sensitive element may be disposed between the display panel and the insulating layer.

The second touch sensitive element may further include a third electrode enclosing an inner circumferential surface of the bending member, and a fourth electrode enclosing an outer circumferential surface of the bending member.

An inside of the bending member may be filled with the same conductive material as the third electrode.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed:

1. A display device, comprising:
   a display panel including an active area having a bending area;
   a first touch sensitive element which overlaps the active area of the display panel;
   a bending member which is disposed below the display panel and overlaps at least partially the bending area;
   a columnar unit within the bending member, the columnar unit having a cylindrical shape; and
   a second touch sensitive element which overlaps at least partially the bending member,
   wherein the columnar unit is configured to extend long in a direction perpendicular to the direction in which the display panel is bent, and is not formed of an electroactive polymer,
   wherein the second touch sensitive element includes:
   a third electrode surrounding the columnar unit and is disposed in contact with columnar unit;
   a second electroactive layer surrounding the third electrode and is disposed in contact with third electrode; and
   a fourth electrode surrounding the second electroactive layer and is disposed in contact with the second electroactive layer.

2. The display device according to claim 1, wherein the first touch sensitive element is disposed between the display panel and the second touch sensitive element, and
   wherein the first touch sensitive element includes:
   a first electroactive layer;
   a first electrode is disposed on a first surface of the first electroactive layer; and
   a second electrode is disposed on a second surface of the first electroactive layer that is opposite to the first surface of the first electroactive layer.

3. The display device according to claim 1, wherein the columnar unit formed of an insulating material.

4. The display device according to claim 1, wherein
   the first electroactive layer and the second electroactive layer share the bending member as a common electrode.

5. The display device according to claim 4, further comprising:
   a plurality of first electrodes disposed on a surface of the first electroactive layer opposite to the bending member, and
   a plurality of fourth electrodes disposed on a surface of the second electroactive layer opposite to the bending member,
   wherein the plurality of first electrodes and the plurality of fourth electrodes are configured to receive a same voltage.

6. The display device according to claim 2, further comprising:
   a plurality of first electrodes disposed on a first surface of the first electroactive layer and a plurality of second electrodes disposed on a second surface of the first electroactive layer,
   a plurality of third electrodes disposed on a first surface of the second electroactive layer and a plurality of fourth electrodes disposed on a second surface of the second electroactive layer,
   wherein:
   the plurality of first electrodes and the plurality of third electrodes are configured to receive a same first voltage, and
   the plurality of second electrodes and the plurality of fourth electrodes are configured to receive a same second voltage.

7. A display device, comprising:
   a display panel including an active area having a bending area;
   a first touch sensitive element under the display panel;
   a second touch sensitive element under the display panel and overlapping the bending area of the display panel; and
   a bending member between the first touch sensitive element and the second touch sensitive element, and
   wherein the bending member includes a columnar unit overlapping at least partially the bending area and wherein the bending member includes a support element on both sides of the columnar unit, the support element rotates around the columnar unit, and overlaps at least partially the bending area,
   wherein the columnar unit is configured to extend long in a direction perpendicular to the direction in which the display panel is bent and is not formed of an electroactive polymer, the columnar unit having a cylindrical shape.

8. The display device according to claim 7, wherein the support element overlaps at least a portion of the active area beyond the bending area and supports the active area.

9. The display device according to claim 7,
   wherein the first touch sensitive element includes:
   a first electroactive layer is disposed between the display panel and a first surface of bending member; and
   one or more first electrodes are disposed between the display panel and the first electroactive layer,
   wherein the second touch sensitive element includes:
   a second electroactive layer is disposed to below of the bending member; and
   one or more fourth electrodes are disposed on a first surface of the second electroactive layer.

10. The display device according to claim 9, wherein the bending member is formed of an insulating material,
wherein the first touch sensitive element further comprises one or more second electrodes between the first surface of the bending member and the first electroactive layer, and
wherein the second touch sensitive element further comprises one or more third electrodes disposed between a second surface of the bending member and a first surface of the second electroactive layer.

11. The display device according to claim 9, wherein the bending member is formed of a conductive material,
wherein the first touch sensitive element further comprises one or more second electrodes disposed between the first surface of the bending member and the first electroactive layer, and
the bending member is in contact with a second surface of the second electroactive layer that is opposite to the first surface of the second electroactive layer and serves as a third electrode of the second touch sensitive element having the second electroactive layer.

12. The display device according to claim 9, wherein the bending member is in contact with the second surface of the second electroactive and a first of the first electroactive layer respectively.

13. The method of claim 7, wherein the second touch sensitive element overlaps a second area smaller than a first area that the first touch sensitive element overlaps.

14. A display device, comprising:
a display panel having an active area that includes a bending area;
a first touch sensitive element overlapping the active area; and
a second touch sensitive element which is disposed below the display panel corresponding to the bending area and includes: a hollow tube-shaped bending member formed of an electroactive polymer and changed its shape in the presence of an electric field;
a third electrode contacting an inner circumferential surface of the bending member;
a fourth electrode contacting and surrounding an outer circumferential surface of the bending member, and
the bending member surrounding the third electrode,
wherein the bending member is formed to extend long in a direction perpendicular to the direction in which the display panel is bent.

15. The display device according to claim 14, further comprising:
an insulating layer disposed between the display panel and the second touch sensitive element,
wherein the first touch sensitive element is disposed between the display panel and the insulating layer.

16. The display device according to claim 14, wherein an inside of the hollow bending member is filled with a same conductive material as the third electrode.

* * * * *